3,033,859
PROCESS FOR THE MANUFACTURE OF
OXIDO-STEROIDS
Oskar Jeger, Zurich, and Duilio Arigoni, Zollikerberg,
Switzerland, assignors to Ciba Pharmaceutical Products
Inc., Summit, N.J.
No Drawing. Filed Feb. 9, 1960, Ser. No. 7,544
Claims priority, application Switzerland Feb. 12, 1959
3 Claims. (Cl. 260—239.55)

The present invention is based on the observation that $11\beta$:18-oxido-steroids can be obtained by reacting $11\beta$-hydroxy-steroids with acyloxy radicals having an oxidizing action.

The process is illustrated by the following formula scheme:

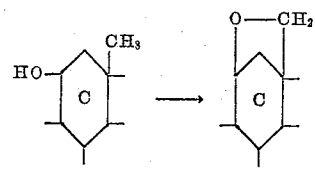

For the conversion of the $11\beta$-hydroxy-steroids to the $11\beta$:18-oxido-steroids in accordance with the process of the invention there are suitable those acyloxy radicals having an oxidizing action which are obtained by decomposition of metal acylates. As metal acylates there may be mentioned more especially lead tetraacylates, e.g. lead tetraacetate or lead tetrabenzoate. These reactions can be catalyzed by addition of peroxides, e.g. benzoyl peroxide. The reaction with the oxidizing agent may suitably be carried out in inert solvents such as hydrocarbons, for example, benzene. Especially suitable are saturated hydrocarbons, such as cyclohexane, primarily methyl cyclohexane, also dimethyl cyclohexane, advantageously in the presence of a weak base, e.g. calcium carbonate. It is advantageous to work at temperatures between 50° and 100° C. It is, however, also possible to carry out the reaction at either above or below this temperature range.

As starting materials for the present process there are suitable any desired $11\beta$-hydroxy steroid which is derived from cholestane, coprostane, ergostane, spirostane, cholane, norcholane, bisnorcholane, pregnane and androstane. There may be mentioned more especially the $11\beta$-hydroxy-pregnanes and $11\beta$-hydroxy-androstanes of the $5\alpha$- and $5\beta$-series. The starting materials may contain in the ring system, especially in one or more of the 1, 2, 3, 4, 5, 6, 7, 8, 9, 12, 14, 15, 16, 17, 20, 21, etc., positions, further substituents, such as esterified or etherified hydroxy groups or free or functionally converted, e.g. ketalized oxo groups, alkyl groups such as a methyl group, or halogen atoms. Furthermore, the starting materials may also contain double bonds, for example, extending from the carbon atom in the 5-position, that is to say, in the 4:5- or 5:6-position. Specific starting materials are, for example, the following compounds: $3\beta$:$11\beta$-dihydroxy-cholestane, $3\beta$:$11\beta$-dihydroxy-spirostane, $3\beta$:$11\beta$-dihydroxy-20-ethylenedioxy-$5\alpha$-pregnane, $3\alpha$:$11\beta$-dihydroxy-20-ethylenedioxy-$5\beta$-pregnane, $3\beta$:$11\beta$:$17\beta$-trihydroxy-$5\alpha$-androstane, $3\alpha$,$11\beta$,$17\beta$-trihydroxy-$5\beta$-androstane, as well as the 3-monoesters and 3-monoethers or the 3:17-diesters of the specified compounds; further the 3:20-bisketals of hydrocortisone, $2\alpha$-methyl-hydrocortisone, $6\alpha$-methyl-hydrocortisone, 6-fluoro- and 6-chloro-hydrocortisone, $16\alpha$-hydroxy-hydrocortisone, $16\alpha$- and $16\beta$-methyl-hydrocortisone, corticosterone, $11\beta$-hydroxy-progesterone, as well as the 3:20-bis-ketals of the corresponding $9\alpha$-halogeno-, especially $9\alpha$-fluoro-derivatives; the 3-monoketals of $11\beta$-hydroxy-testosterone, $11\beta$-hydroxy-$17\beta$-acetoxy-$17\alpha$-methyl-testosterone, $9\alpha$-fluoro-$11\beta$-hydroxy-$17\beta$-acetoxy-$17\alpha$-methyl-testosterone.

The $11\beta$:18-oxido-steroids of the present invention are pharmacologically active. The corresponding pregnane compounds have an effect on mineral metabolism which is comparable with that of known suprarenal hormones. Androstane compounds have an anabolic effect in doses in which the androgenic effect is of insignificant importance.

In addition, for example, the androstane and pregnane compounds can also be used as intermediate products for the manufacture of known physiologically active compounds. For example, in these compounds the 11:18-oxido group can be converted into the (11→18)-lactone group by means of chromium trioxide or ruthenium tetroxide; in this manner compounds are obtained which can be converted by known methods, for example into derivatives of aldosterone and its most closely related compounds. When in the products of the process the side chains of the other steroid series mentioned above are present in the 17-position, they can also be degraded by known methods to form androstane or pregnane compounds.

The following example illustrates the invention.

*Example*

500 mg. of $\Delta^5$-3:20 - bis - ethylenedioxy-$11\beta$-hydroxy-pregnene are dissolved in 30 cc. of benzene, the solution mixed with 820 mg. of lead-(IV)-acetate and boiled overnight under reflux. The suspension thus obtained is poured into potassium iodide solution, the mixture extracted with ether and the organic phase washed with dilute sodium sulfite solution and with water. After distilling off the ether the residue obtained is purified by chromatography on neutral aluminum oxide of activity II. Besides some unchanged starting material there is obtained $\Delta^5$-3:20-bis-ethylenedioxy - 11:18 - oxido-pregnene, which with the ketal-splitting agent para-toluenesulfonic-acid in acetone solution yields $\Delta^4$-3:20-dioxo-$11\beta$:18-oxido-pregnene($11\beta$:18-oxido-progesterone).

In an analogous manner the $11\beta$-hydroxy-steroids mentioned in the above description can be converted into the corresponding $11\beta$:18-oxido-compounds.

What is claimed is:

1. Process for the manufacture of $11\beta$:18-oxido-steroids of the pregnane series, wherein a member selected from the group consisting of an 18-unsubstituted $11\beta$-hydroxy-pregnane having a free hydroxyl group only in the 11-position, and a derivative thereof unsaturated in the nucleus, is reacted with an acylate of tetravalent lead derived from an acid selected from the group consisting of lower aliphatic carboxylic acids and monocyclic aromatic carboxylic acids.

2. Process as claimed in claim 1, wherein the reaction is carried out with lead tetra-acetate.

3. Process as claimed in claim 1, wherein the 3:20-bis-ethylene ketal of $11\beta$-hydroxy-progesterone is used as starting material.

No references cited.